(12) United States Patent
Tozuka et al.

(10) Patent No.: US 10,574,115 B2
(45) Date of Patent: Feb. 25, 2020

(54) MOTOR DEVICE

(71) Applicant: MITSUBA Corporation, Gunma (JP)

(72) Inventors: Yosuke Tozuka, Gunma (JP); Naohiro Iwatate, Gunma (JP)

(73) Assignee: MITSUBA Corporation, Gunma (JP)

(*) Notice: Subject to any disclaimer, the term of this patent is extended or adjusted under 35 U.S.C. 154(b) by 122 days.

(21) Appl. No.: 15/743,666

(22) PCT Filed: Jun. 13, 2016

(86) PCT No.: PCT/JP2016/067502
§ 371 (c)(1),
(2) Date: Jan. 11, 2018

(87) PCT Pub. No.: WO2017/018081
PCT Pub. Date: Feb. 2, 2017

(65) Prior Publication Data
US 2018/0205287 A1   Jul. 19, 2018

(30) Foreign Application Priority Data
Jul. 30, 2015   (JP) ................. 2015-151091

(51) Int. Cl.
H02K 5/24        (2006.01)
H02K 7/116       (2006.01)
(Continued)

(52) U.S. Cl.
CPC .......... H02K 7/116 (2013.01); F16H 57/021 (2013.01); H02K 5/148 (2013.01); H02K 5/225 (2013.01);
(Continued)

(58) Field of Classification Search
CPC ...................................... H02K 5/225
See application file for complete search history.

(56) References Cited

U.S. PATENT DOCUMENTS 6,201,326 B1    3/2001   Klappenbach et al.
7,605,506 B2 *  10/2009  Kanda ............... H02K 5/148
                                              310/51

(Continued)

FOREIGN PATENT DOCUMENTS

CN    1741351      3/2006
CN    101114781    1/2008
(Continued)

OTHER PUBLICATIONS

"International Search Report (Form PCT/ISA/210) of PCT/JP2016/067502", dated Aug. 9, 2016, with English translation thereof, pp. 1-2.

(Continued)

Primary Examiner — Dang D Le
(74) Attorney, Agent, or Firm — JCIPRNET

(57) ABSTRACT

A power supply member 50 is provided with a convex part 60 that fits into either of a pair of cutout parts provided in a gear case, thereby positioning a connector connecting part 52 with respect to the gear case and a motor yoke along a circumferential direction of a rotating body. Thus, with a single power supply member 50 it is possible to form a seat motor with various specifications (disposition mode A and disposition mode B) wherein the protrusion direction of the connector connecting part 52 differs. Accordingly, the layout property can be improved, versatility can be increased, and yield can be improved.

6 Claims, 10 Drawing Sheets

(51) Int. Cl.
*F16H 57/021* (2012.01)
*H02K 5/14* (2006.01)
*H02K 5/22* (2006.01)

(52) U.S. Cl.
CPC ....... *H02K 5/24* (2013.01); *F16H 2057/0213* (2013.01)

(56) References Cited

U.S. PATENT DOCUMENTS

2005/0280324 A1   12/2005   Yamashita
2006/0043803 A1*   3/2006   Yagi .................... H02K 7/1166
                                                      310/68 B

FOREIGN PATENT DOCUMENTS

| | | |
|---|---|---|
| CN | 101273511 | 9/2008 |
| CN | 101546937 | 9/2009 |
| JP | S61113559 | 7/1986 |
| JP | 2001346355 | 12/2001 |
| JP | 2008236995 | 10/2008 |
| JP | 2013207889 | 10/2013 |

OTHER PUBLICATIONS

Office Action of China Counterpart Application, with English translation thereof, dated Mar. 11, 2019, pp. 1-15.

\* cited by examiner

[DISPOSITION MODE A]

[DISPOSITION MODE B]

MOTOR DEVICE

CROSS-REFERENCE TO RELATED APPLICATION

This application is a 371 application of the international PCT application serial no. PCT/JP2016/067502, filed on Jun. 13, 2016, which claims the priority benefit of Japan application no. 2015-151091, filed on Jul. 30, 2015. The entirety of each of the abovementioned patent applications is hereby incorporated by reference herein and made a part of this specification.

TECHNICAL FIELD

The present invention relates to a motor device having a power supply member for supplying a drive current provided between a pair of cases housing rotors.

BACKGROUND ART

In the past, there have been motor devices mounted in vehicles such as automobiles to be used as drive sources of power window devices or power seat devices. In-vehicle motor devices are installed in narrow spaces such as an inside of a door or an inside of a seat cushion. For this reason, miniaturization and better layout properties of motor devices have been demanded.

Patent Literature 1, for example, has disclosed such an in-vehicle motor device (a motor). The motor disclosed in Patent Literature 1 includes a motor main body constituting a pair of cases and a deceleration unit, and the components are brought in contact with each other to become one piece. A yoke housing of the motor main body houses a rotor having a commutator such that the rotor can freely rotate. Meanwhile, a gear housing of the deceleration unit houses a worm shaft which is rotated by the rotor and a worm wheel which is rotated by the worm shaft.

In addition, a brush holder is provided in a space between the yoke housing and the gear housing. The brush holder has a holder main body holding a brush and a power supply unit which is provided to be exposed to the outside of the motor device and supplies a drive current to the brush. Thus, when an external power source supplies a drive current to the power supply unit, the rotor rotates. The rotation of the rotor is transmitted from the worm shaft to the worm wheel, a speed thereof thus decreases, and a rotation force having high torque is output from an output shaft of the worm wheel to the outside.

CITATION LIST

Patent Literature

Patent Literature 1

Japanese Unexamined Patent Application, First Publication No. 2001-346355 (FIG. 1)

SUMMARY OF INVENTION

Technical Problem

In the motor device disclosed in Patent Literature 1, the power supply unit of the brush holder protrudes in a direction intersecting both the shaft direction of the output shaft and the shaft direction of the worm shaft (the opposite direction to the worm wheel of a rotation shaft). In addition, a direction in which the power supply unit is assembled into the case is determined. Thus, in order to form motor devices with various types of specifications in which directions or positions of the power supply unit are diversified to improve a layout property, it is necessary to prepare brush holders, gear housings, and the like having different shapes, which deteriorates yield.

An objective of the present invention is to provide a motor device of which a layout property can be improved, versatility can be increased, and yield can be improved.

Solution to Problem

According to an aspect of the invention, a motor device includes a rotating body having a commutator, a first case and a second case that house the rotating body such that the rotating body can freely rotate, a power supply member that is provided between the first case and the second case and supplies a drive current to the commutator, a plurality of concave parts which are provided on at least one of combination parts of the first case and the second case, disposed around a shaft center of the rotating body with a predetermined interval therebetween in a circumferential direction of the rotating body, and pitted in a shaft direction of the rotating body, a brush holder part which is provided in the power supply member, has a penetration hole through which the commutator penetrates, and holds a brush in sliding contact with the commutator, a connector connecting part which is provided on an outer side of the brush holder part in a diameter direction and connects an external connector, and a convex part which is provided in the power supply member, goes into one of the plurality of concave parts, and determines a position of the connector connecting part with respect to the first case and the second case in the circumferential direction of the rotating body.

According to another aspect of the invention, the convex part is provided between the brush holder part and the connector connecting part.

According to still another aspect of the invention, the first case is a gear case which houses a deceleration mechanism therein, the deceleration mechanism comprises a worm gear provided in the rotating body, a worm wheel gear which meshes with the worm gear, and an output shaft which outputs rotation of the worm wheel gear to the outside, the gear case has a support hole which supports the output shaft such that the output shaft can freely turn, and the pair of concave parts is formed in the gear case to face each other in an extension direction of a line segment parallel to an extension direction of the support hole.

According to still another aspect of the invention, the second case is a motor yoke having permanent magnets mounted therein, the motor yoke has a pair of plane surface parts and a pair of circular arc surface parts, with each pair facing each other in directions intersecting the shaft direction of the rotating body, and the pair of plane surface parts faces each other in an extension direction of a line segment parallel to the extension direction of the support hole.

According to still another aspect of the invention, the permanent magnets are each mounted inside the pair of circular arc surface parts.

According to still another aspect of the invention, the power supply member has conductive members which are provided between the brush holder part and the connector connecting part and enable the drive current to flow therethrough, and a cover member configured to cover the conductive members, and the cover member forms the convex part.

Advantageous Effects of Invention

According to the invention, since the convex part which goes into any one of the plurality of concave parts provided in the case and determines a position of the connector connecting part with respect to the cases in the circumferential direction of the rotating body is provided in the power supply member, motor devices having various specifications in which the protrusion direction of the connector connecting part differs can be formed with the one power supply member. Therefore, a layout property can be improved, versatility can be increased, and yield can be improved.

DESCRIPTION OF EMBODIMENTS

An embodiment of the invention will be described in detail below with reference to the accompanying drawings.

Figure 1:
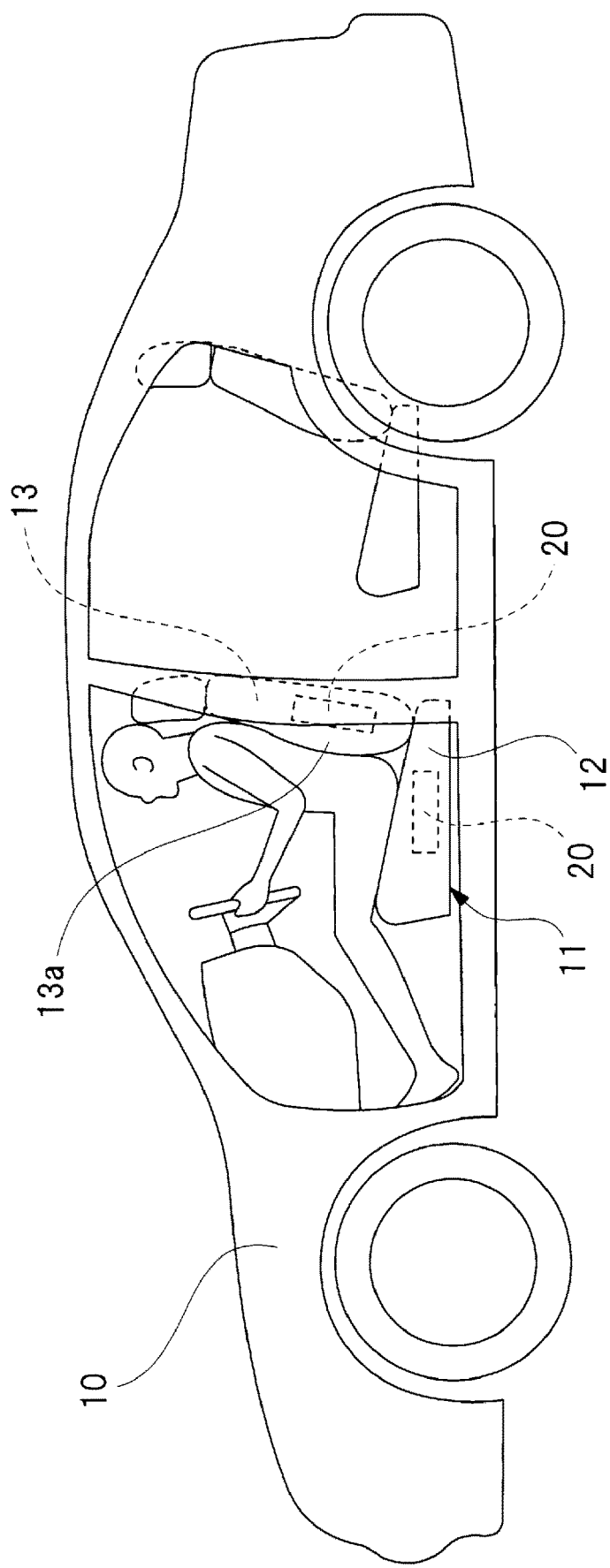
FIG. 1 is a schematic diagram showing an automobile in which a seat motor is mounted.
Figure 2:
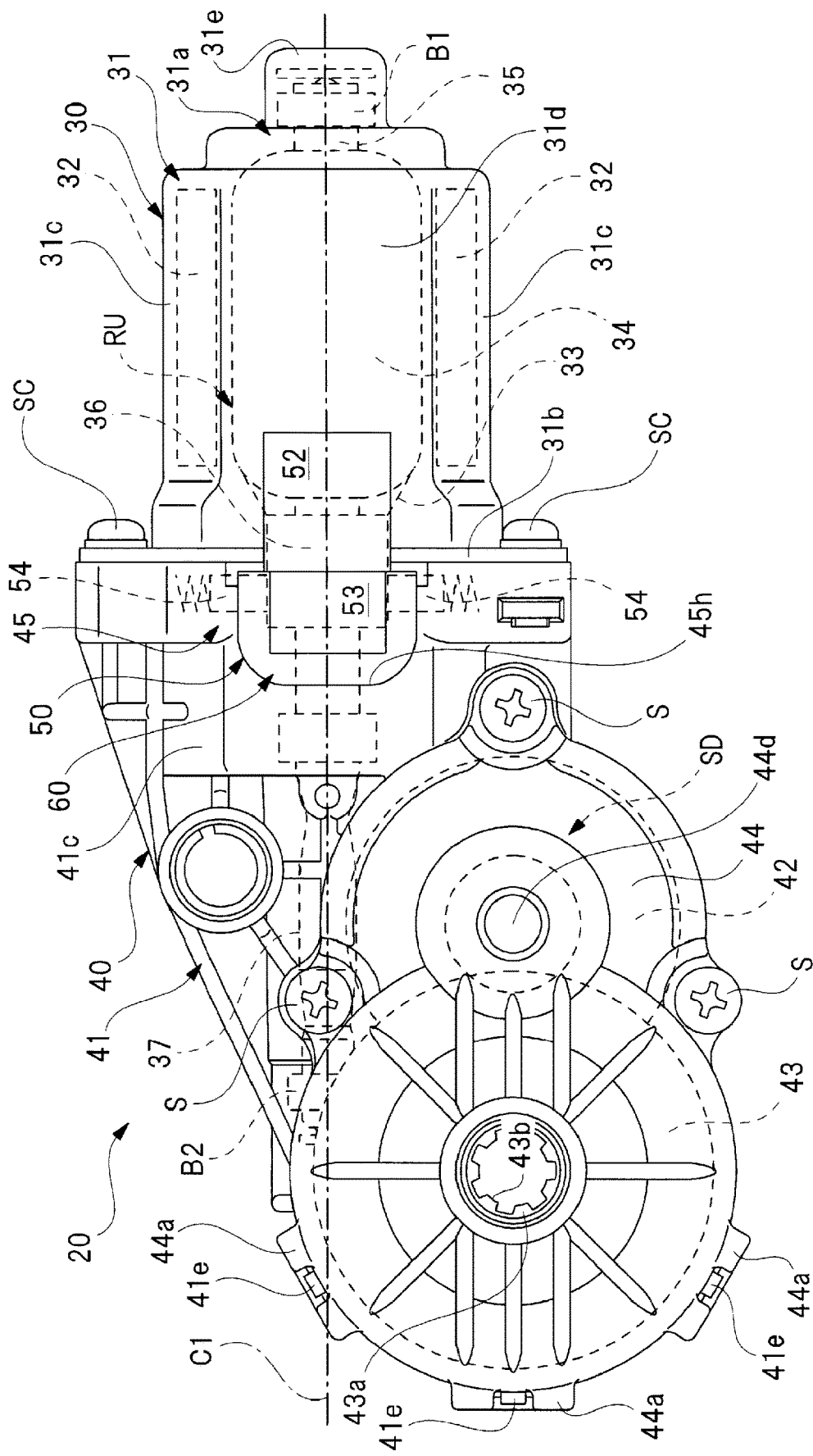
FIG. 2 is a plan view showing the seat motor.
Figure 3:
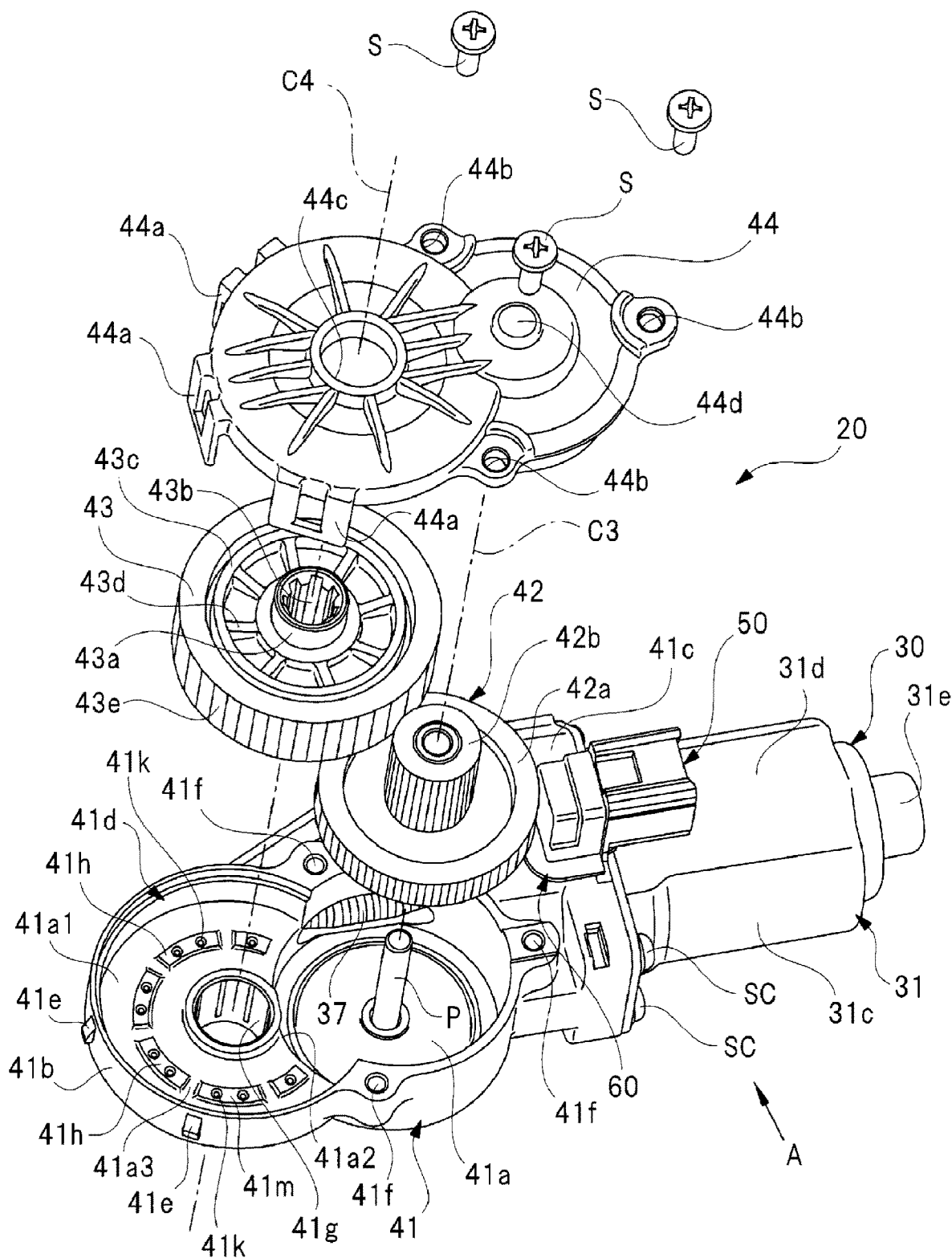
FIG. 3 is an exploded perspective diagram showing an internal structure of the seat motor.
Figure 4:
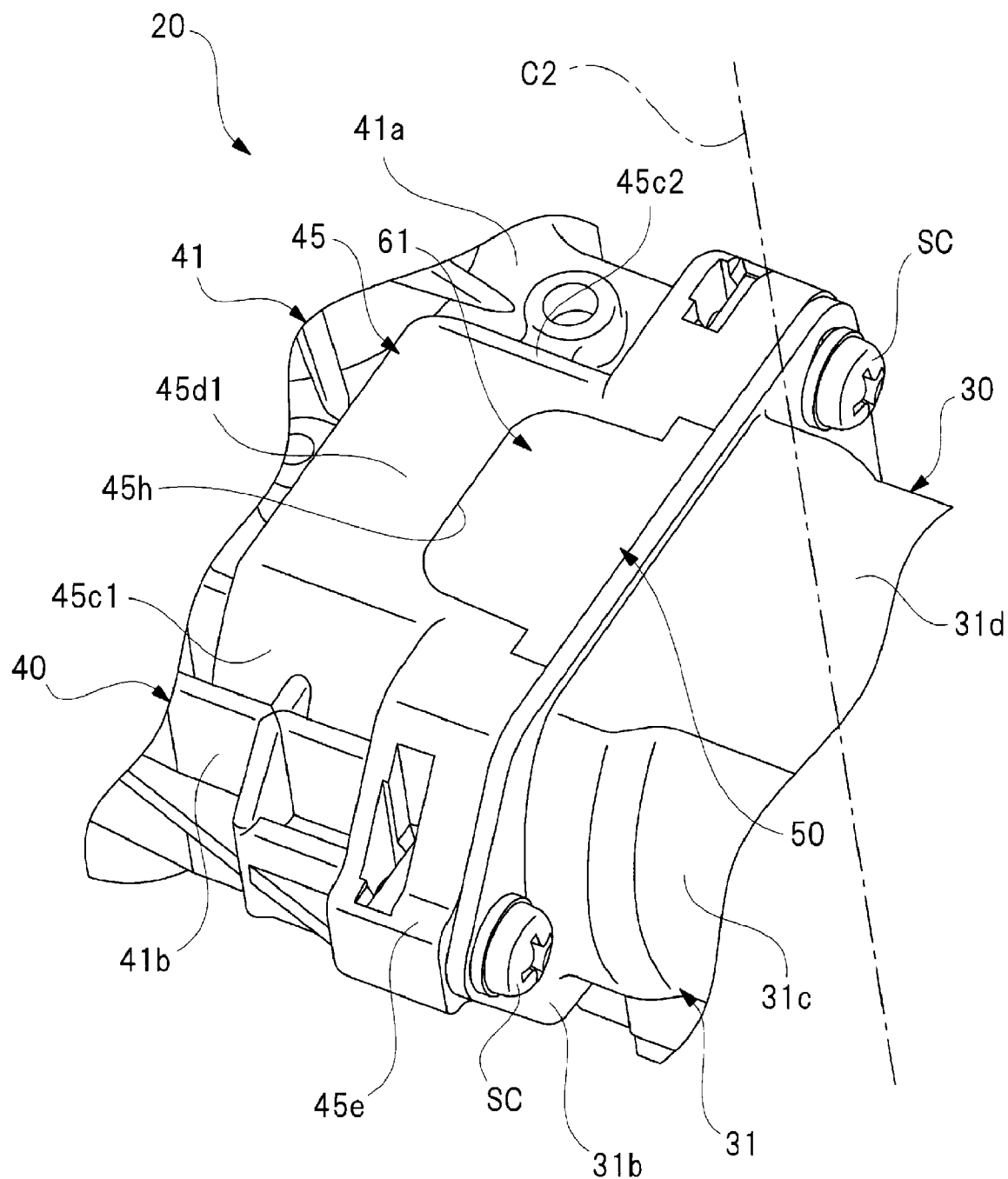
FIG. 4 is a partially enlarged perspective diagram of the seat motor viewed in the direction of the arrow A of FIG. 3.
Figure 5:
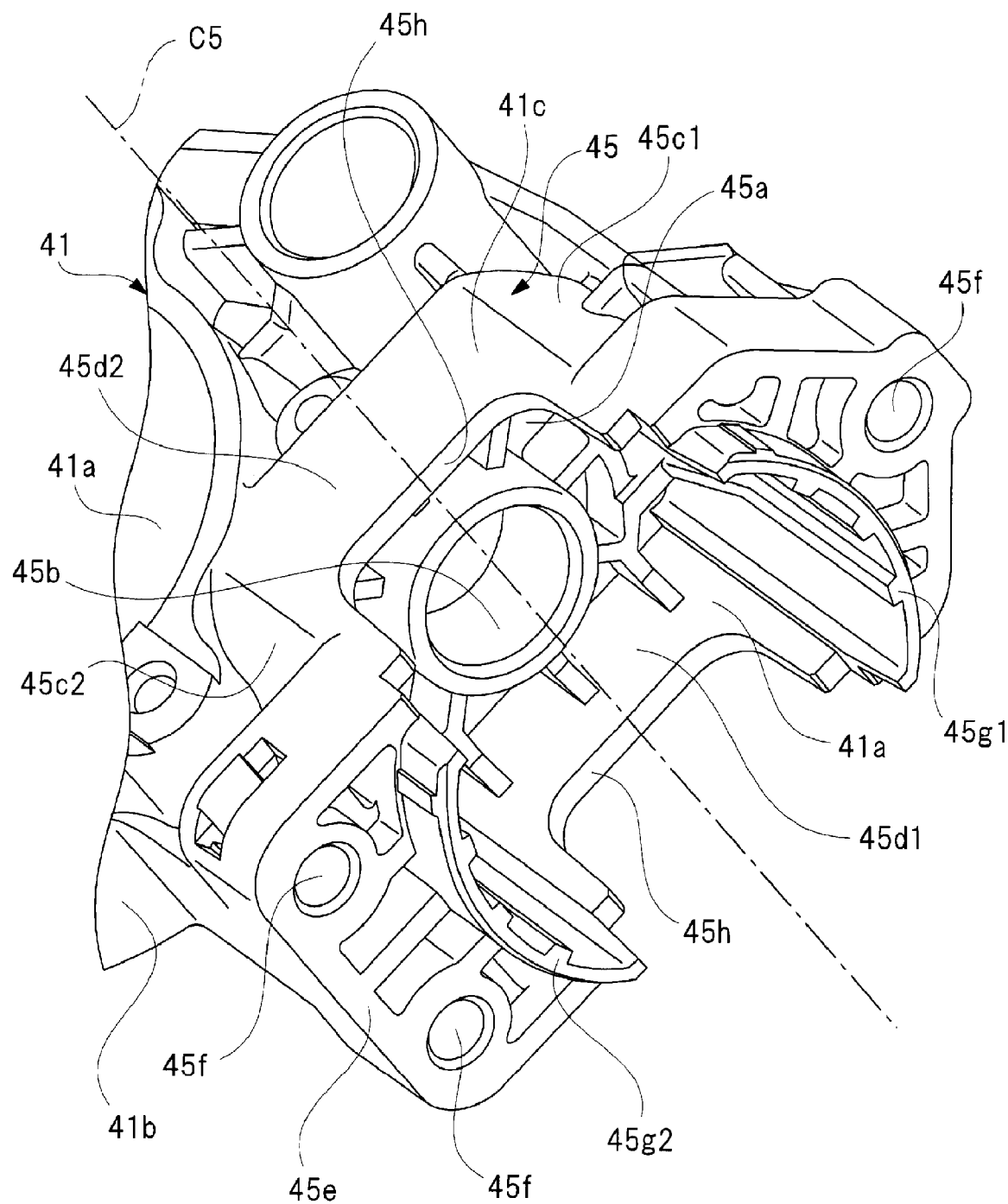
FIG. 5 is a partially enlarged perspective diagram for describing a detailed structure of a cutout part of a gear case.
Figure 6:
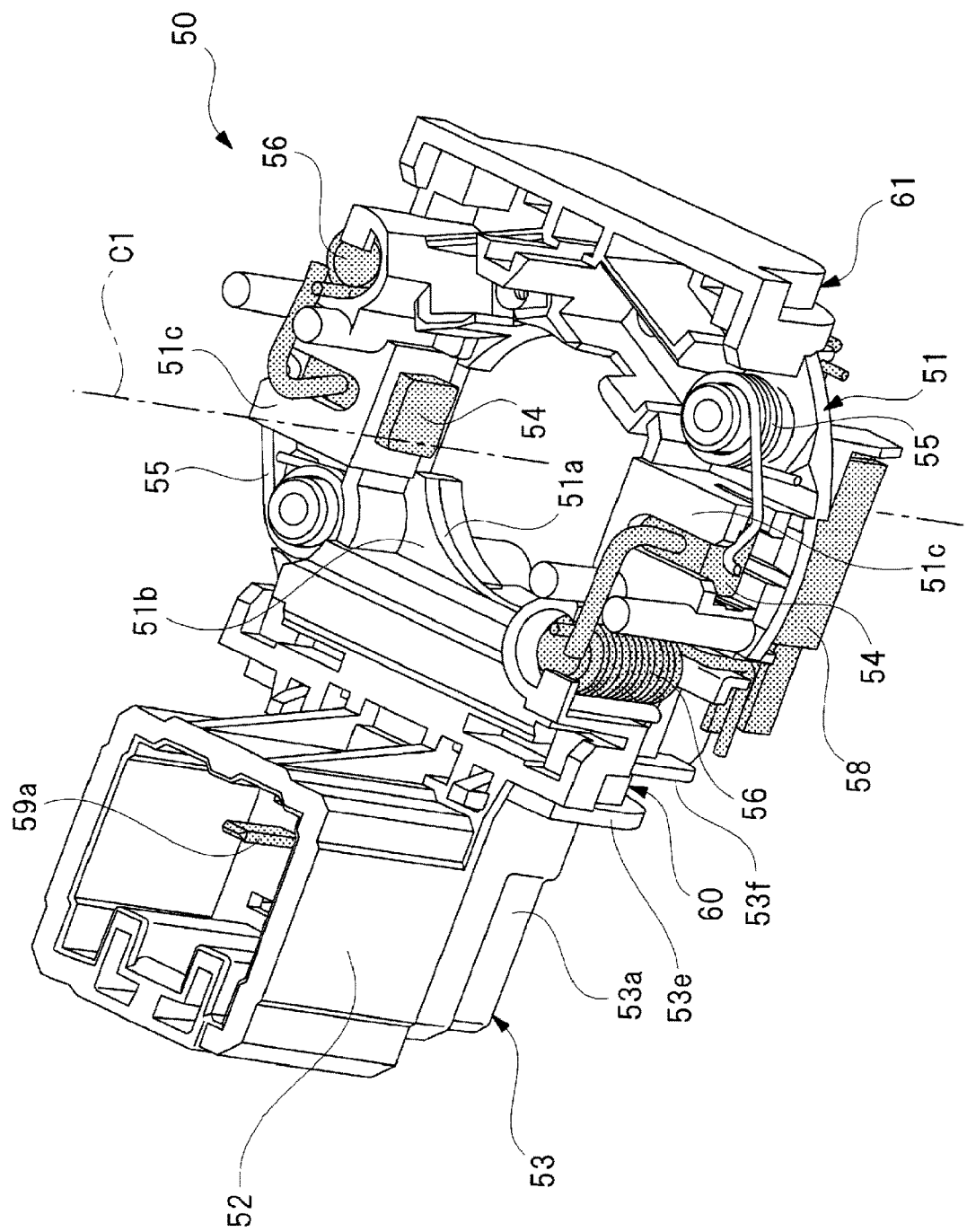
FIG. 6 is a perspective diagram for describing a detailed structure of a power supply member.
Figure 7:
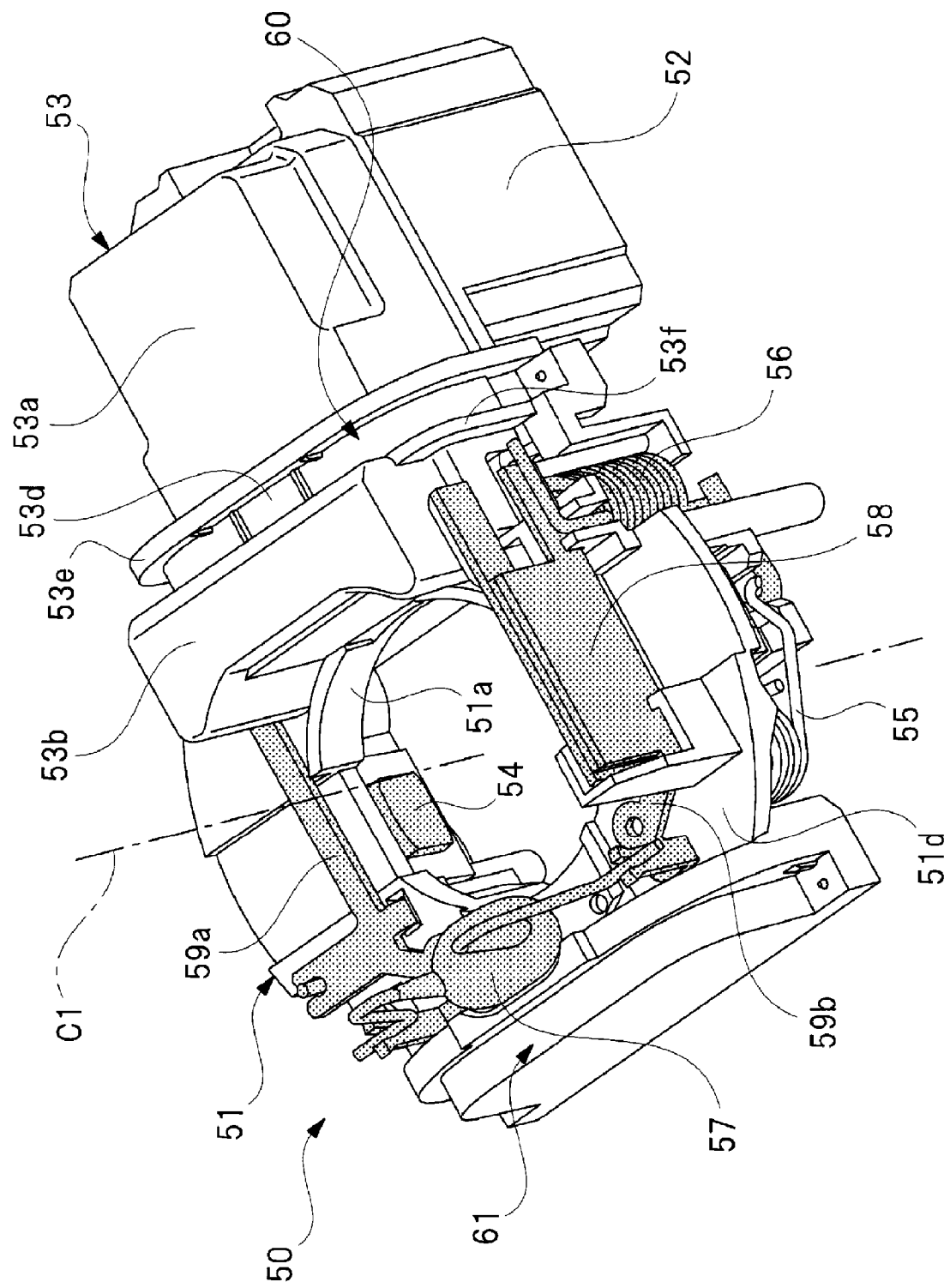
FIG. 7 is a perspective diagram of the power supply member viewed from the side on which a connector cover is provided.
Figure 8:
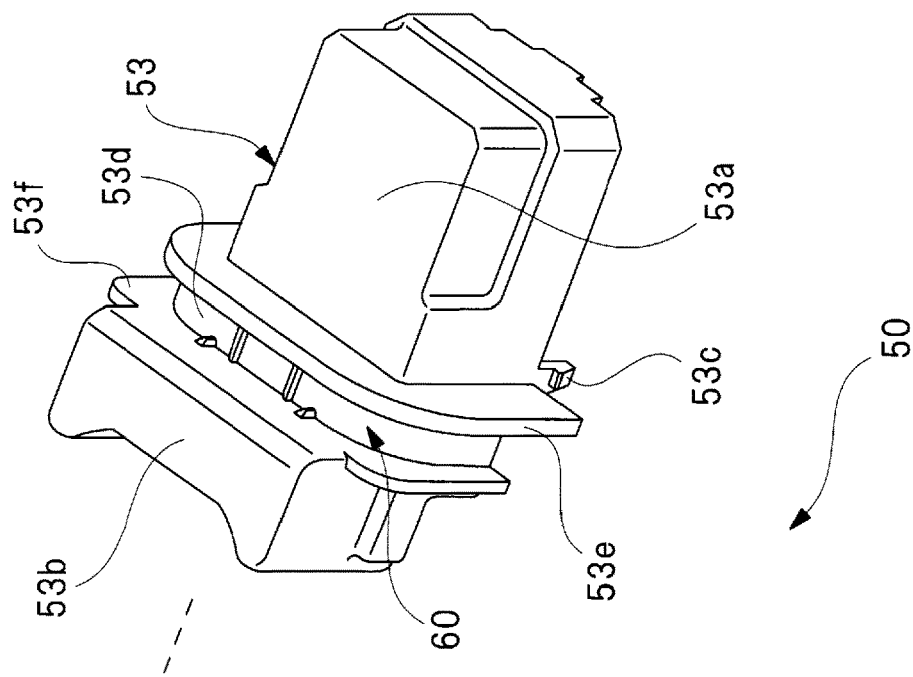
FIG. 8 is a perspective diagram for describing an installation procedure of the connector cover.
Figure 8:
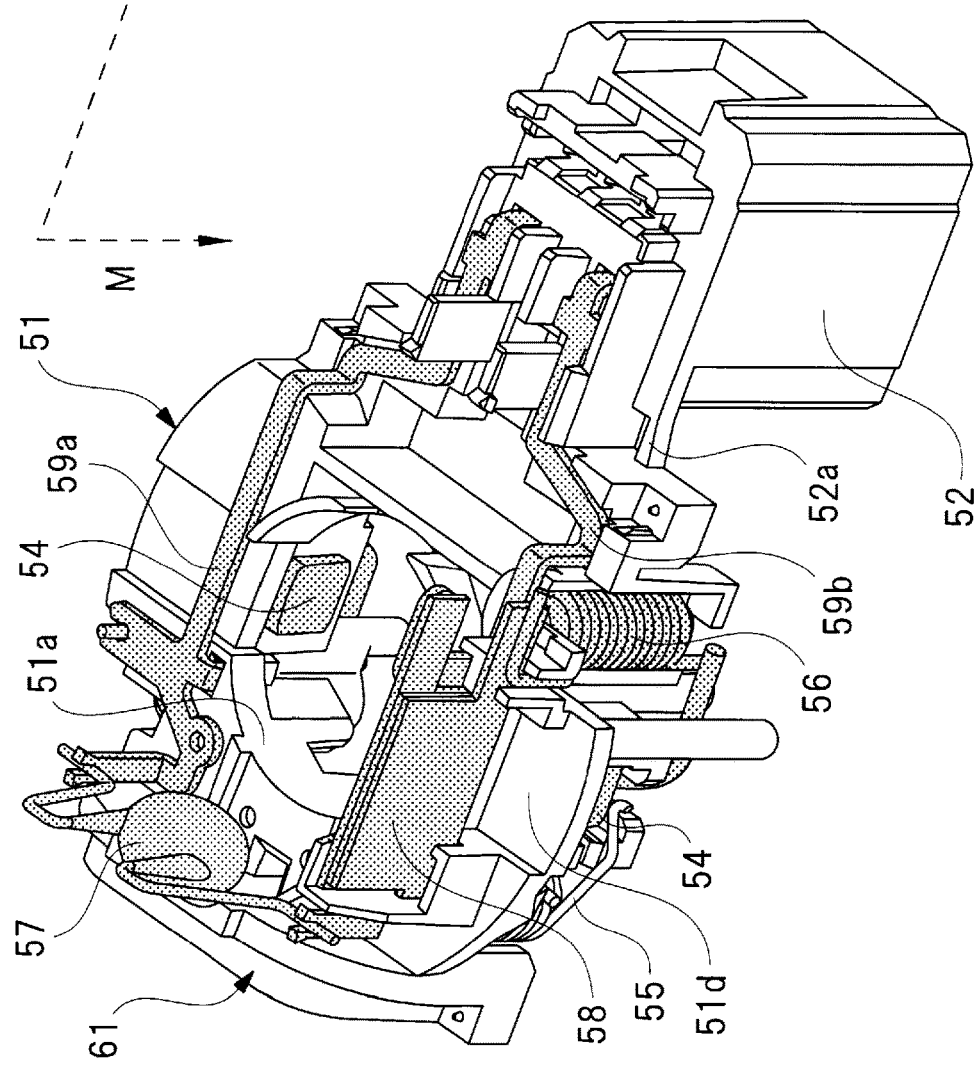
Figure 9A:
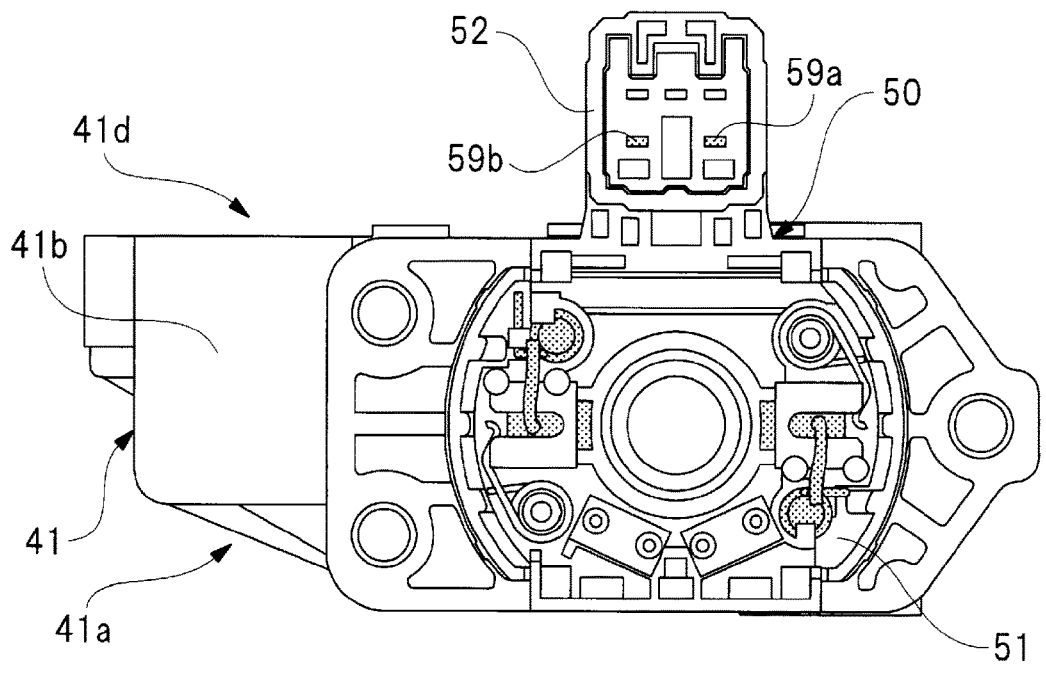
FIG. 9 (a) is a diagram in which a connector connecting part is arranged on an opening part side of the gear case, and FIG. 9 (b) is a diagram in which the connector connecting part is arranged on a bottom wall part side of the gear case.
Figure 9B:
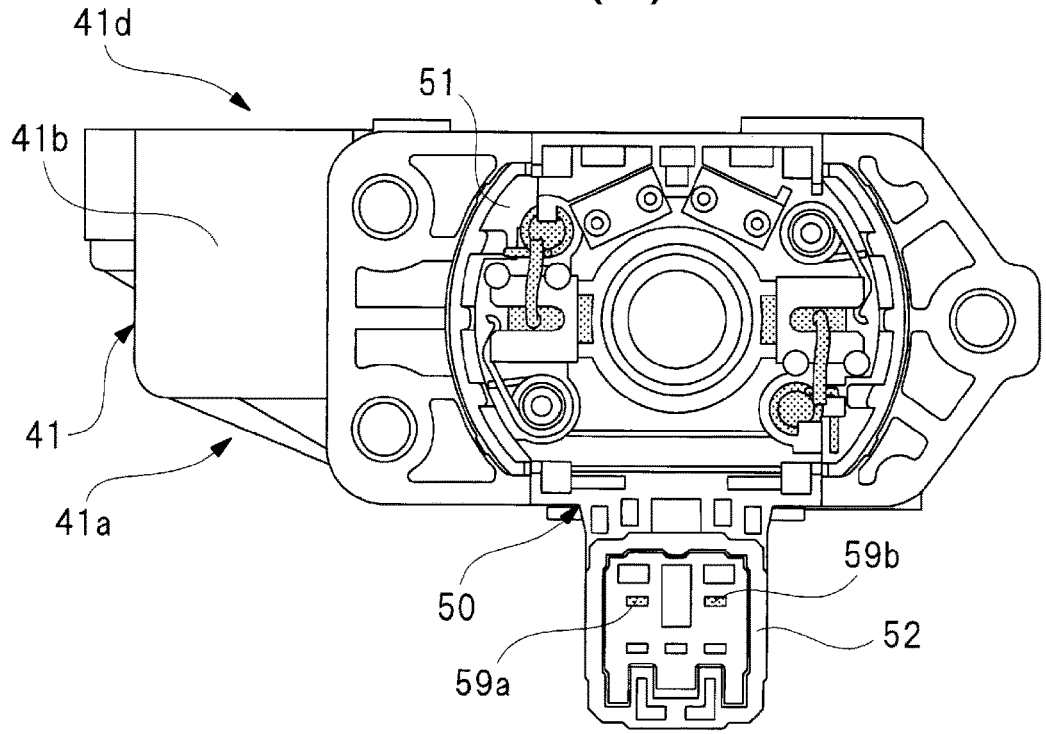
Figure 10:
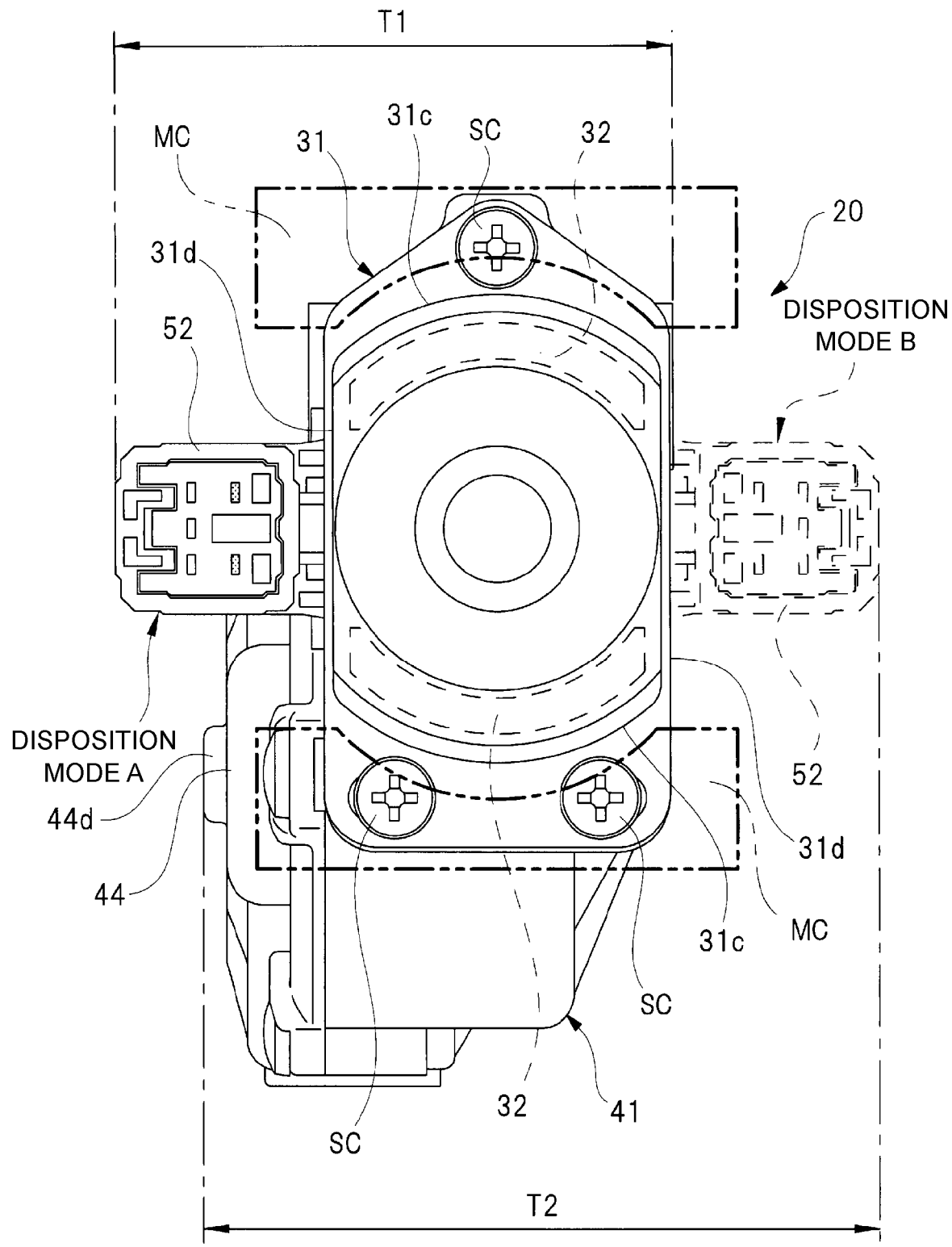
FIG. 10 is an illustrative diagram for describing a magnetization procedure using a magnetizer.

FIG. 1 is a schematic diagram showing an automobile in which a seat motor is mounted, FIG. 2 is a plan view showing the seat motor, FIG. 3 is an exploded perspective diagram showing an internal structure of the seat motor, FIG. 4 is a partially enlarged perspective diagram of the seat motor viewed in the direction of the arrow A of FIG. 3, FIG. 5 is a partially enlarged perspective diagram for describing a detailed structure of a cutout part of a gear case, FIG. 6 is a perspective diagram for describing a detailed structure of a power supply member, FIG. 7 is a perspective diagram of the power supply member viewed from the side on which a connector cover is provided, FIG. 8 is a perspective diagram for describing an installation procedure of the connector cover, FIG. 9 (a) is a diagram in which a connector connecting part is arranged on an opening part side of the gear case, FIG. 9 (b) is a diagram in which the connector connecting part is arranged on a bottom wall part side of the gear case, and FIG. 10 is an illustrative diagram for describing a magnetization procedure using a magnetizer.

As shown in FIG. 1, an automobile 10 is a sedan-type passenger car, and has power seat devices 11 provided at each of a driver's seat, a passenger's seat, and the like for adjusting positions of a driver and passengers in the car body. Each power seat device 11 has a seat cushion part 12 and a seat back part 13. In addition, two seat motors (motor devices) 20 for seat position adjustment are installed inside each of the seat cushion part 12 and the seat back part 13 (details thereof are not illustrated). The seat motors 20 installed in the seat cushion part 12 cause the seat cushion part 12 to move in the longitudinal direction or the vertical direction of the automobile. The seat motors 20 installed in the seat back part 13 cause the seat back part 13 to incline or a lumbar support part 13a of the seat back part 13 to move inward or outward.

A plurality of seat motors 20 installed in the power seat device 11 are each driven to rotate in forward and backward directions through operations of an operation switch (which is not illustrated) of a driver or a passenger, and thereby the above-described movement operations are appropriately performed. A structure of a seat motor 20 will be described in detail using the drawings.

The seat motor 20 has a motor part 30 and a gear part 40 as shown in FIG. 2 to FIG. 4. In addition, a power supply member 50 for supply a drive current to the motor part 30 is provided between the motor part 30 and the gear part 40. In addition, the power supply member 50 is sandwiched between the motor part 30 and the gear part 40 by combining the motor part 30 and the gear part 40 and connecting them using three fastening screws SC (only two are shown in the drawing).

The motor part 30 has a stepped bottom 31a on one side in the length direction thereof (the right in the drawing) formed by performing press work on a steel sheet, which is made of a magnetic material, and a motor yoke (a second case) 31 having a flange part 31b on the other side in the length direction (the left in the drawing) as shown in FIG. 2. The motor yoke 31 houses a rotating body RU such that the rotating body can freely rotate, and has a pair of circular arc surface parts 31c and a pair of plane parts 31d (only one of which is shown in the drawing), with each pair facing each other in directions intersecting a shaft direction of a shaft center C1 of the rotating body RU. These pairs of circular arc surface parts 31c and plane parts 31d alternately join together in a circumferential direction of the rotating body RU, and accordingly a cross-sectional shape of the motor yoke 31 is substantially an oval shape.

In other words, a thickness of the motor yoke 31 in the direction in which the pair of plane parts 31d faces each other is thin. Accordingly, due to the motor part 30 having a flattened shape, the seat motor 20 can be installed in a narrow space. Note that a gear case 41, which will be described below, forming the gear part 40 also has a flattened shape in accordance with the flat shape of the motor yoke 31 (refer to FIG. 3).

Here, a line segment C2 drawn in FIG. 4 is a line segment extending parallel to an extension direction of a shaft center C4 of a case-side boss part 41g (refer to FIG. 3) provided in a bottom wall part 41a of the gear case 41. That is, the line segment C2 and the shaft center C4 of an output gear 43 are parallel to each other. In addition, the pair of plane parts 31d is provided in the motor yoke 31 to face the extension direction of the line segment C2.

Permanent magnets 32 each having a cross-section in a substantially C-shaped circular arc shape are each fixed to the inside of the circular arc surface parts 31c of the motor yoke 31. The pair of permanent magnets 32 has an armature 34 having a coil (winding wire) 33 wound thereon such that the armature can freely rotate with a predetermined gap therebetween. An armature shaft (a rotation shaft) 35 penetrates and is fixed to a shaft center of the armature 34. The armature shaft 35 is provided such that the armature shaft traverses the motor part 30 and the gear part 40 together. One side of the armature shaft 35 (the right in the drawing) in the shaft direction is disposed inside a bearing holding part 31e which is formed to further protrude from the stepped bottom 31a, and supported by a first bearing B1, which is disposed inside the bearing holding part 31e, such that the armature shaft can freely rotate. Meanwhile, the other side of the armature shaft 35 in the shaft direction (the left in the drawing) is disposed inside the gear case 41, and supported by a second bearing B2, which is disposed inside the gear case 41, such that the armature shaft can freely rotate.

A commutator 36 formed in a substantial barrel shape is fixed to a part which is a substantial center part of the armature shaft 35 in the shaft direction in proximity to the armature 34. An end part of the coil 33 wound around the armature 34 is electrically connected to the commutator 36.

A pair of brushes 54 provided in the power supply member 50 is in sliding contact with an outer circumference of the commutator 36. The pair of brushes 54 is each pressed by torsion spring members 55 with respect to the commutator 36 with a certain level of pressure. Accordingly, by supplying a drive current to the pair of brushes 54 from an in-vehicle controller, which is not illustrated, the drive current is supplied to the commutator 36, and thus an electromagnetic force is generated in the armature 34. Therefore, the armature shaft 35 rotates with a predetermined rotation frequency and rotation torque.

A worm gear 37 is provided on the other side of the armature shaft 35 in the shaft direction. The worm gear 37 is formed to have a substantial barrel shape and integrated with the armature shaft 35 through a rolling process or the like. The worm gear 37 meshes with a worm wheel gear 42 (refer to FIG. 3) housed in the gear case 41 such that the worm wheel gear can freely rotate. Accordingly, the worm gear 37 rotates with rotation of the armature shaft 35 inside the gear case 41, and rotation thereof is transmitted to the worm wheel gear 42. Here, the rotating body RU is formed by the armature 34, the armature shaft 35, the commutator 36, and the worm gear 37.

As illustrated in FIG. 2 to FIG. 5, the gear part 40 has the gear case (a first case) 41. The gear case 41 houses the rotating body RU and a deceleration mechanism SD, which will be described below, such that the components can freely rotate, and is formed of a resin material such as plastic in a predetermined shape. The gear case 41 has the bottom wall part 41a extending in the shaft direction of the rotating body RU, a side wall part 41b extending in a direction intersecting the extension direction of the bottom wall part 41a, and a top wall part 41c extending on the motor yoke 31 side in the same direction as the bottom wall part 41a. In addition, a part of the gear case 41 opposite to the bottom wall part 41a is opened and the opened part forms an opening 41d. Furthermore, the worm wheel gear 42 and the output gear 43 are each incorporated with the gear case 41 therein via the opening 41d.

As shown in FIG. 3, the opening 41d is formed in substantially a gourd shape along shapes of the worm wheel gear 42 (having a smaller diameter) and the output gear 43 (having a larger diameter) which will be described below. In addition, the opening 41d is closed by a gear cover 44 which is formed of a resin material such as plastic in substantially a gourd shape. Here, as shown in FIG. 2, three engagement projections 41e are provided on the outer side of the side wall part 41b in parts of the gear case 41 in which the output gear 43 is incorporated, and three engagement pawls 44a which are engaged with the three engagement projections 41e are provided in the gear cover 44. In addition, as shown in FIG. 3, three female screw parts 41f are provided close to the opening 41d of the side wall part 41b in parts of the gear case 41 in which the worm wheel gear 42 is incorporated, and three screw insertion holes 44b are provided in the gear cover 44 to face the female screw parts 41f.

That is, the gear cover 44 is fixed to the gear case 41 through fixation using three fixation screws S and the engagement projections 41e and the engagement pawls 44a both of which are provided three in number. Accordingly, when the seat motor 20 is assembled, temporary fixation of the gear cover 44 to the gear case 41 can be reliably performed using the three engagement projections 41e and the engagement pawls 44a, and workability for assembly of the seat motor 20 can be improved. In addition, even when a large amount of load is imposed on the seat motor 20 during its use, the three fixation screws S enable the gear cover 44 to be firmly fixed to the gear case 41. Thus, rattling of the gear cover 44 with respect to the gear case 41 is suppressed, and generation of abnormal noises from the seat motor 20 is also suppressed.

The worm wheel gear 42 is formed of a resin material such as plastic in substantially a disk shape, and includes a larger-diameter gear part 42a and a smaller-diameter gear part 42b having a smaller diameter than the large-diameter gear part 42a. The worm wheel gear 42 is supported by a support pin P, an end of which is fixed to the bottom wall part 41a of the gear case 41, such that the worm wheel gear can freely turn. That is, the worm wheel gear 42 is designed to turn around a shaft center C3 of the support pin P. In addition, the larger-diameter gear part 42a of the worm wheel gear 42 meshes with the worm gear 37 provided in the armature shaft 35.

Note that the other end of the support pin P is designed to be fixed to an engagement part 44d provided in the gear cover 44 (details thereof are not illustrated). Thus, a relatively large amount of load imposed on the support pin P prevents the gear cover 44 from rattling against the gear case 41, and thus the three fixation screws S are disposed at intervals of about 120 degrees to surround the support pin P.

The output gear 43 has a larger diameter than the worm wheel gear 42, and meshes with the smaller-diameter gear part 42b of the worm wheel gear 42. An output shaft 43a having substantially a cylindrical shape is provided around the shaft center C4 of the output gear 43 as one piece. A serration fitting part 43b having an uneven shape is formed inside the output shaft 43a in the diameter direction. A drive force transmission mechanism (which is not illustrated) such as a propeller which causes the seat back part 13 to incline is fitted into the serration fitting part 43b such that the components can rotate as one piece.

Sides of the output shaft 43a in the shaft direction protrude from both side surfaces of the output gear 43 in the shaft direction having a predetermined height. In addition, both sides of the output shaft 43a in the shaft direction are supported by a case-side boss part (a support hole) 41g provided to be integrated with the bottom wall part 41a of the gear case 41 and a cover-side boss part 44c provided to be integrated with the gear cover 44 such that the output shaft can freely turn.

Here, as shown in FIG. 3, a plurality of sliding projections 41h which reduce sliding resistance of the output gear 43 are provided in parts of the bottom wall part 41a opposite to the output gear 43 such that the sliding projections are in contact with the output gear 43 in small areas. Each of the sliding projections 41h protrudes from another bottom wall part 41a1 which is formed to be one level higher than the bottom wall part 41a, and grease storage recesses 41k which are filled with grease (which is not illustrated) are provided on an end surface of each of the sliding projections 41h.

The plurality of the sliding projections 41h are provided in a region on a circumference of a circle around the shaft center C4 of the output gear 43, the region not including a step part 41a2, with predetermined intervals therebetween. In the present embodiment, six sliding projections 41h are arranged on the circumference with equal intervals therebetween. Among the six sliding projections 41h, the sliding projections 41h on both ends in the arrangement direction are shorter than the other sliding projections 41h in the arrangement direction. In addition, the four sliding projections 41h that are comparatively longer in the arrangement direction each have two grease storage recesses 41k formed on their end surfaces, and the two sliding projections 41h at both ends that are comparatively shorter in the arrangement direction each have one grease storage recesses 41k formed on their end surfaces.

The plurality of sliding projections 41h are adjacent to each other with gaps 41a3 therebetween, and the gaps 41a3 are disposed between adjacent sliding projections 41h such that inward and outward areas of the other bottom wall part 41a1 with respect to the sliding projection 41h communicate with each other.

Here, an annular sliding-contact ring part 43c is provided in the output gear 43 as shown in FIG. 3. Specifically, a plurality of connection parts 43d radially extending from the output shaft 43a are formed in the output gear 43, the sliding-contact ring part 43c which is concentric with the output shaft 43a is formed at tips of the connection parts 43d, and an outer circumference gear part 43e which meshes with the smaller-diameter gear part 42b of the worm wheel gear 42 is formed around the sliding-contact ring part 43c. In other words, the output gear 43, which is a gear in the final stage of the deceleration mechanism SD (refer to FIG. 2), has the output shaft 43a, the sliding-contact ring part 43c formed around the output shaft 43a, and the outer circumference gear part 43e formed around the sliding-contact ring part 43c, and the output shaft 43a, the sliding-contact ring part 43c, and the outer circumference gear part 43e are concentric. Furthermore, the sliding-contact ring part 43c of the output gear 43 is positioned on the same circumference as that on which the sliding projection 41h is disposed.

In addition, while the end surfaces 41m of the sliding projections 41h jutting out on an inner surface of the other bottom wall part 41a1 are planes, the end surface of the sliding-contact ring part 43c which comes in sliding contact with the end surfaces 41m of the sliding projections 41h in a sliding manner is a circular arc surface (which is not illustrated). Furthermore, the vertex of the end surface (a circular arc surface) of the sliding-contact ring part 43c is positioned on the same circumference as that on which the sliding projections 41h are disposed. Accordingly, the sliding projections 41h (in the other bottom wall part 41a1) and the sliding-contact ring part 43c (the output gear 43) come in contact with each other in a smaller area, and thus sliding resistance of the output gear 43 further decreases.

The worm gear 37 constituting a part of the rotating body RU (refer to FIG. 2), the worm wheel gear 42 that meshes with the worm gear 37, the output gear 43 that meshes with the worm wheel gear 42, and the output shaft 43a that outputs rotation of the worm wheel gear 42 to the outside (a drive mechanism such as a propeller) constitute the deceleration mechanism SD. That is, the deceleration mechanism SD of the seat motor 20 decelerates a "first level" at a part at which the worm gear 37 meshes with the larger-diameter gear part 42a, and a "second level" at a part at which the smaller-diameter gear part 42b meshes with the output gear 43.

As shown in FIG. 2, a brush holder housing part 45 which houses a brush holder part 51 of the power supply member 50 is provided in the gear case 41 on the motor yoke 31 side in the shaft direction of the rotating body RU as one piece. Accordingly, the power supply member 50 is provided to be sandwiched between the gear case 41 and the motor yoke 31. The brush holder housing part 45 has a bottom part 45a as shown in FIG. 5. The bottom part 45a extends to the bottom wall part 41a of the gear case 41 in the same direction as the side wall part 41b. A shaft insertion hole 45b into which the armature shaft 35 (refer to FIG. 2) is inserted is provided at substantially the center part of the bottom part 45a.

The brush holder housing part 45 has a pair of circular arc walls 45c1 and 45c2 and a pair of plane walls 45d1 and 45d2, with each pair facing each other in directions intersecting the shaft direction of the shaft center C1 (refer to FIG. 2) of the rotating body RU. That is, a cross-sectional shape of the brush holder housing part 45 is substantially an oval like the cross-sectional shape of the motor yoke 31. With this configuration, the gear case 41 also has a flattened shape. Note that the plane wall 45d1 is formed with a part of the bottom wall part 41a of the gear case 41 and the plane wall 45d2 is formed with a part of the top wall part 41c of the gear case 41.

In addition, a seat surface part 45e protruding in a direction intersecting the shaft direction of the shaft center C1 of the rotating body RU is provided on an opening side of the brush holder housing part 45, i.e., on the motor yoke 31 side. The seat surface part 45e provided in the gear case 41 is combined with the flange part 31b provided in the motor yoke 31 in the shaft direction of the shaft center C1 of the rotating body RU. Furthermore, the seat surface part 45e of the gear case 41 and the flange part 31b of the motor yoke 31 are firmly fixed to each other using the three fastening screws SC (refer to FIG. 2). Note that a total of three female screw parts 45f into which the three fastening screws SC are screwed are formed in the seat surface part 45e as shown in FIG. 5.

A pair of spigot fitting parts 45g1 and 45g2, cross-sections of which are formed in substantially circular arc shapes, is provided respectively in the pair of circular arc walls 45c1 and 45c2 such that the spigot fitting parts protrude toward the motor yoke 31 rather than the seat surface part 45e. The spigot fitting parts 45g1 and 45g2 extend in the shaft direction of the rotating body RU and fit into an inside of the flange part 31b (refer to FIG. 2) of the pair of circular arc surface parts 31c of the motor yoke 31.

Cutout parts 45h having the same shape are provided in each of the pair of plane walls 45d1 and 45d2. These cutout parts 45h constitute concave parts in the invention. The pair of cutout parts 45h is each provided in combined parts of the gear case 41 with the motor yoke 31 and are disposed around the shaft center C1 of the rotating body RU with predetermined intervals therebetween (180-degree intervals) in the circumferential direction of the rotating body RU. That is, the pair of cutout parts 45h is disposed to face each other with the shaft center C1 of the rotating body RU therebetween. In addition, the pair of cutout parts 45h is cut out to be substantially U-shaped such that the cutout parts are pitted in the shaft direction of the rotating body RU.

Here, a line segment C5 drawn in FIG. 5 is a line segment extending parallel to an extension direction of the shaft center C4 of the case-side boss part 41g (refer to FIG. 3) provided in the bottom wall part 41a of the gear case 41. That is, the line segment C5 and the shaft center C4 of the output gear 43 are parallel to each other. In addition, the pair of cutout parts 45h is provided in the gear case 41 to face each other in the extension direction of the line segment C5.

The brush holder housing part 45 houses the power supply member 50 as shown in FIG. 6 to FIG. 8. The power supply member 50 has the brush holder part 51 formed in substantially an annular shape, a connector connecting part 52 formed in substantially a box shape, and a connector cover (a cover member) 53 mounted on a back side of the connector connecting part 52. The brush holder part 51 and the connector connecting part 52 are each formed of resin materials (insulating materials) such as plastic so that a plurality of electronic components and the like are mounted therein.

The brush holder part 51 forming the power supply member 50 is a part housed by the brush holder housing part 45. That is, the brush holder part 51 is not exposed to an outside of the seat motor 20 (refer to FIG. 2). Meanwhile, the connector connecting part 52 is provided integrated with the brush holder part 51 on an outer side in the diameter direction, and is exposed to the outside of the brush holder housing part 45, i.e., the outside of the seat motor 20 (refer to FIG. 2).

A penetration hole 51a through which the commutator 36 (refer to FIG. 2) penetrates is provided in the brush holder part 51. A pair of brush cases 51c which holds the brushes 54 such that the brushes can freely move is provided on one side surface (a surface) 51b of the brush holder part 51 as shown in FIG. 6. The brush cases 51c as well as the brushes 54 are disposed to face each other with the penetration hole 51a therebetween, and the pair of brushes 54 is each pressed by the spring members 55 toward the commutator 36. In addition, choke coils 56 each connected to the pair of brushes 54 are provided on the side surface 51b of the brush holder part 51. Here, in the drawing, members having electricity conduction are indicated with hatching to facilitate understanding of an arrangement relationship thereof.

As shown in FIG. 7 and FIG. 8, one capacitor 57 is provided on the other side surface of the brush holder part 51 (rear surface) 51da such that the capacitor straddles between the pair of brushes 54. In addition, one PTC thermistor 58 is provided corresponding to one brush 54. Here, the pair of choke coils 56 and the one capacitor 57 are provided to prevent electrical noise generated by the brushes 54 from dispersing to the outside. In addition, the PTC thermistor 58 functions as a protective circuit element that protects electric circuits from an abrupt temperature rise of the power supply member 50.

As shown in FIG. 8, a pair of conductive members 59a and 59b which enable a drive current to flows to the pair of brushes 54 is provided through the brush holder part 51 and the connector connecting part 52. These conductive members 59a and 59b are formed in a predetermined shape by performing press processing or the like on plate-shaped brass or the like, which has excellent conductivity, and inserted from rear sides of the brush holder part 51 and the connector connecting part 52 (from the other side surface 51d side) to be fixed thereto.

Sides of the pair of conductive members 59a and 59b (only one is shown in the drawing) in a longitudinal direction are exposed toward an inner side of the connector connecting part 52 as shown in FIG. 6. On the other hand, the other sides of the pair of conductive members 59a and 59b in the longitudinal direction are each electrically connected to the pair of brushes 54 via the pair of choke coils 56 and the like. Accordingly, a drive current is supplied to each of the pair of brushes 54 from an external connector (which is not illustrated), which is provided on the automobile 10 side and connected to the connector connecting part 52, via the pair of conductive members 59a and 59b, and thus drives the rotating body RU (refer to FIG. 2) of the motor part 30 to rotate.

As shown in FIG. 8, most part of the connector connecting part 52 on the other side surface 51d side and a part of the brush holder part 51 on the other side surface 51d side are covered by the connector cover 53. That is, the connector cover 53 is designed to cover the exposed part of the pair of conductive members 59a and 59b to the outside (the part close to the connector connecting part 52). Accordingly, occurrence of conduction failure can be prevented.

The connector cover 53 covers the most part of the connector connecting part 52 on the other side surface 51d side, and has an externally exposed part 53a which is exposed to the outside of the seat motor 20. In addition, the connector cover 53 covers a part of the brush holder part 51 on the other side surface 51d side and has an internally disposed part 53b which is disposed inside the seat motor 20. As shown in FIG. 8, the externally exposed part 53a has a pair of fixing pawls 53c (only one thereof is shown in the drawing). These fixing pawls 53c are disposed to face each other with the externally exposed part 53a therebetween.

Meanwhile, a pair of hook parts 52a (only one thereof is shown in the drawing) into which the pair of fixing pawls 53c provided in the connector cover 53 is hooked is provided at parts between the brush holder part 51 and the connector connecting part 52 that are close to the connector connecting part 52. These hook parts 52a are disposed to face each other with the connector connecting part 52 therebetween. Accordingly, the pair of fixing pawls 53c is each hooked into the pair of hook parts 52a by bringing the connector cover 53 to face the brush holder part 51 and the connector connecting part 52 as indicated by the dashed-line arrow M of FIG. 8, and thus the connector cover 53 is mounted on the brush holder part 51 and the connector connecting part 52.

Having the connector cover 53 mounted on the brush holder part 51 and the connector connecting part 52, that is, having the power supply member 50 in an assembled state, a convex part 60 protruding toward the other side surface 51d of the brush holder part 51 is provided between the brush holder part 51 and the connector connecting part 52 as shown in FIG. 7. The convex part 60 is formed in a substantial square shape having corners on a protrusion side (an upper side in the drawing) in a circular arc shape, an outer flange part 53e is provided in the convex part 60 on the externally exposed part 53a side and an inner flange part 53f is provided in the convex part 60 on the internally disposed part 53b side such that the flange parts form a groove shape, and due to the groove shape, the convex part 60 can tightly go into any one of the pair of cutout parts 45h provided in the gear case 41.

The convex part 60 is formed in a cover intermediate part 53d formed between the externally exposed part 53a and the internally disposed part 53b of the connector cover 53. In addition, by selecting one of the pair of cutout parts 45h provided in the gear case 41 and causing the selected cutout part 45h to engage with the convex part 60, a position of the connector connecting part 52 with respect to the gear case 41 and the motor yoke 31 (refer to FIG. 2) in the circumferential direction of the rotating body RU is determined. In this manner, the convex part 60 functions to determine the position of the connector connecting part 52 with respect to the gear case 41 and the motor yoke 31 in two disposition modes (refer to FIG. 9(a) and FIG. 9(b)).

In addition, a lid part 61 is provided on an outer side of the brush holder part 51 in the diameter direction and a side opposite to the convex part 60 side with respect to the shaft center C1 of the rotating body RU in an integrated manner. The lid part 61 is formed to have the same shape as the convex part 60. That is, the lid part 61 protrudes from the other side surface 51d of the brush holder part 51 and is formed in a substantial square shape having corners on a protrusion side in a circular arc shape. Accordingly, the lid part 61 can tightly go into any one of the pair of cutout parts 45h provided in the gear case 41, like the convex part 60.

The lid part 61 is mounted into the cutout part 45h provided on the side on which the convex part 60 is not mounted as shown in FIG. 4, thereby closing the cutout part 45h. Accordingly, infiltration of dust and the like into the brush holder housing part 45 can be suppressed, and occurrence of defects such as short-circuiting of a plurality of electronic components (refer to FIG. 8) mounted in the brush holder part 51 can be reliably prevented.

Here, the lid part 61 also has the function of determining a position of the connector connecting part 52 with respect to the gear case 41 and the motor yoke 31 in the two disposition modes (refer to FIG. 9(a) and FIG. 9(b)), like the convex part 60. Thus, due to the positioning of the connector connecting part 52 with respect to the gear case 41 and the motor yoke 31 at the two places of the convex part 60 and the lid part 61, rattling of the power supply member 50 with respect to the gear case 41 and the motor yoke 31 can be reliably suppressed.

Note that, since the seat motors 20 are provide in an interior of the automobile 10 as shown in FIG. 1, there is virtually no chance that the seat motors are exposed to rainwater, dust, or the like. Thus, any one of the convex part 60 and the lid part 61 can be omitted. In this case, a weight reduction and a simplified structure of the power supply member 50 can be achieved. In addition, when the convex part 60 is omitted, the lid part 61 constitutes a convex part in the invention.

However, it is desirable to leave the convex part 60 between the brush holder part 51 and the connector connecting part 52 in order to secure a certain degree of stiffness with respect to an insertion load of an external connector (which is not illustrated) into the connector connecting part 52 and to omit the lid part 61.

Moreover, the lid part 61 can be formed as a separate body without being provided as one piece with the brush holder part 51, formed of a rubber material having more flexibility than plastic or the lie, and can fit into the cutout part 45h provided on the side on which the convex part 60 is not mounted.

Here, for the seat motor 20 according to the present embodiment, the disposition modes A and B (two types) of the connector connecting part 52 as shown in FIG. 9 (a) and (b) can be obtained. Note that only the gear case 41 and the power supply member 50 are shown in FIG. 9(a) and FIG. 9(b).

Disposition Mode A

As shown in FIG. 2, FIG. 3, FIG. 4, and FIG. 9 (a), the disposition mode A is for the seat motor 20 in which the convex part 60 of the power supply member 50 goes into the cutout part 45h positioned on the top wall part 41c side of the gear case 41 and the lid part 61 of the power supply member 50 goes into the cutout part 45h positioned on the bottom wall part 41a side of the gear case 41.

In this case, the connector connecting part 52 of the power supply member 50 protrudes on the opening 41d side of the gear case 41, and thus an external connector is inserted into the connector connecting part 52 from the direction of the motor part 30. Here, since the connector connecting part 52 is disposed on the plane part 31d of the motor yoke 31, an external connector can be easily inserted thereinto without increasing the thickness of the seat motor 20 as a whole. Specifically, an external connector can be easily connected to the connector connecting part 52 even when groping is performed for connection by moving the external connector on the plane part 31d in accordance therewith.

Disposition Mode B

As shown in FIG. 9 (b), the disposition mode B is for the seat motor 20 in which, on the contrary of the above-described disposition mode A, the convex part 60 of the power supply member 50 goes into the cutout part 45h positioned on the bottom wall part 41a side of the gear case 41 and the lid part 61 of the power supply member 50 goes into the cutout part 45h positioned on the top wall part 41c side of the gear case 41.

In this case, the connector connecting part 52 of the power supply member 50 protrudes on the bottom wall part 41a side of the gear case 41 and thus an external connector is inserted into the connector connecting part 52 from the direction of the motor part 30. Here, since the connector connecting part 52 is disposed on the plane part 31d of the motor yoke 31, an external connector can be easily inserted thereinto without increasing the thickness of the seat motor 20 as a whole. An insertion procedure of an external connector into the connector connecting part 52 is similar to that in the above-described disposition mode A.

However, as shown in FIG. 10, the thickness T1 of a seat motor 20 in the disposition mode A is slightly thinner than the thickness T2 of the seat motor 20 in the disposition mode B (T1<T2). The reasons for this are that the engagement part 44d of the support pin P in the gear cover 44 protrudes slightly in the direction of the shaft center C3, and the connector connecting part 52 protrudes in the same direction as the engagement part 44d of the gear cover 44 in the disposition mode A.

As described above, with respect to the seat motor 20 according to the present embodiment, the aspects of the disposition mode A and the disposition mode B can be acquired. In addition, in any of the disposition mode A and B, the connector connecting part 52 is disposed on the plane part 31d of the motor yoke 31. That is, the connector connecting part 52 is disposed at a position around the motor yoke 31 at which the connector connecting part can avoid the pair of permanent magnets 32 as shown in FIG. 10. In other words, the connector connecting part 52 is not disposed on the pair of circular arc surface parts 31 the inside of which the permanent magnets 32 are fixed to.

Thus, as shown in FIG. 10, magnetization work for the pair of permanent magnets 32 can be easily performed in the assembled seat motor 20. Specifically, magnetizing cores MC of a magnetizer (which is not illustrated) each can be disposed on the pair of circular arc surface parts 31c without interfering with the connector connecting part 52, and magnetization work for the pair of permanent magnets 32 can be performed in that state. In this case, since contact of the connector connecting part 52 with the pair of magnetizing cores MC can be reliably suppressed, damage to the connector connecting part 52 that may incur in the magnetization work can be reliably prevented. In addition, since, in the related art, the power supply unit of the motor device protrudes in the direction intersecting both the shaft direction of the output shaft and the shaft direction of the worm shaft (the direction opposite to the worm wheel of the rotation shaft), permanent magnets need to be disposed at positions at which the magnets avoid the power supply unit in order to reliably perform magnetization using magnetizing cores MC, thus a length of the motor yoke 31 in the shaft direction of the rotating body RU may increase, however, the dimension can be restricted as far as possible in the present embodiment.

As described above in detail, the seat motor 20 of the present embodiment has the convex part 60 in the power supply member 50 which goes into any one of the pair of cutout parts 45h provided in the gear case 41 to determine a position of the connector connecting part 52 with respect to the gear case 41 and the motor yoke 31 in the circumferential direction of the rotating body RU.

Accordingly, the seat motor 20 having various specifications (the disposition mode A and the disposition mode B) in which the protrusion direction of the connector connecting part 52 differs can be formed with one power supply member 50. Thus, the layout property can be improved, versatility can be increased, and yield can be improved.

In addition, according to the seat motor 20 of the present embodiment, since the convex part 60 is provided between the brush holder part 51 and the connector connecting part 52, stiffness of a root part of the connector connecting part 52 can be enhanced. Thus, the power supply member 50 that can satisfactorily withstand an insertion load of a relatively large external connector into the connector connecting part 52 can be realized.

Furthermore, according to the seat motor 20 of the present embodiment, the gear case 41 has a case-side boss part 41g which supports the output shaft 43a such that the output shaft can freely turn, and the pair of cutout parts 45h is formed in the gear case 41 such that the cutout parts face each other in the extension direction of the line segment C5 (refer to FIG. 5) parallel to the extension direction of the case-side boss part 41g. Thus, the connector connecting part 52 protrudes in the thickness direction of the seat motor 20, and an external connector can be easily inserted into the connector connecting part 52 without increasing the thickness of the seat motor 20 as a whole.

In addition, according to the seat motor 20 of the present embodiment, the motor yoke 31 has the pair of plane parts 31d and the pair of circular arc surface parts 31c, with each pair facing each other in the directions intersecting the shaft direction of the rotating body RU, and the pair of plane parts 31d is set to face each other in the extension direction of the line segment C2 (refer to FIG. 4) that is parallel to the extension direction of the case-side boss part 41g. Thus, flattening (thinning) of the whole seat motor 20 can be realized.

Furthermore, according to the seat motor 20 of the present embodiment, the permanent magnets 32 are mounted in the inside of the pair of circular arc surface parts 31c. Accordingly, the connector connecting part 52 can be disposed at a position around the motor yoke 31 at which the connector connecting part can avoid the pair of permanent magnets 32. Thus, magnetization work for the pair of permanent magnets 32 can be easily performed in the assembled seat motor 20.

In addition, according to the seat motor 20 of the present embodiment, the power supply member 50 is provided between the brush holder part 51 and the connector connecting part 52 and has the pair of conductive members 59a and 59b on which a drive current flows and the connector cover 53 covering the conductive members 59a and 59b, and the connector cover 53 forms the convex part 60. Thus, mounting work for the pair of conductive members 59a and 59b with respect to the brush holder part 51 and the connector connecting part 52 can be easily performed.

Furthermore, since the part of the connector cover 53 in which the convex part 60 is formed is provided to be sandwiched between the gear case 41 and the motor yoke 31, rattling of the connector cover 53 with respect to the brush holder part 51 and the connector connecting part 52 can be suppressed, and generation of abnormal noises from the seat motor 20 can be suppressed.

The invention is not limited to the above-described embodiment, and it is a matter of course that various modifications can be implemented not departing from the gist of the invention. Although the cutout parts 45h serving as concave parts are provided in only the gear case 41 in the above-described embodiment, for example, the invention is not limited thereto, and the cutout parts may be provided in only the motor yoke 31, or in both the gear case 41 and the motor yoke 31. Thus, a shape of the convex part can be arbitrarily changed accordingly.

In addition, although the two cutout parts 45h serving as concave parts are provided in the gear case 41 such that the cutout parts face each other with 180-degree intervals therebetween in the above-described embodiment, the invention is not limited thereto, and four cutout parts may be provided with 90-degree intervals therebetween, and three cutout parts may be provided with 120-degree intervals therebetween. In these cases, the number of variation in disposition modes of the connector connecting part 52 can increase.

Furthermore, the part of the connector cover 53 in which the convex part 60 is formed is designed to be sandwiched between the gear case 41 and the motor yoke 31 in the above-described embodiment, and thus the pair of fixing pawls 53c provided in the connector cover 53 and the pair of hook parts 52a provided close to the connector connecting part 52 may be omitted.

In addition, although the motor device according to the invention is set as the seat motor 20 in the above-described embodiment, the invention is not limited thereto and can also be applied to motor devices used for other applications including power window devices, wiper devices, and the like. In this case, particularly when a motor device is exposed in a very poor external environment, it is desirable to provide sealing members between the cutout part 45h and the convex part 60 and the cutout part 45h and the lid part 61.

INDUSTRIAL APPLICABILITY

The motor device can be used as a drive source of a power seat device mounted in a vehicle such as an automobile to incline a seat back part.

The invention claimed is:

1. A motor device comprising:
a rotating body having a commutator;
a first case and a second case configured to house the rotating body such that the rotating body can freely rotate;
a power supply member configured to be provided between the first case and the second case and to supply a drive current to the commutator;
a pair of concave parts configured to be provided on at least one of combination parts of the first case and the second case, to be disposed around a shaft center of the rotating body with a predetermined interval therebetween in a circumferential direction of the rotating body, and to be pitted in a shaft direction of the rotating body;

a brush holder part configured to be provided in the power supply member, to have a penetration hole through which the commutator penetrates, and to hold a brush in sliding contact with the commutator;

a connector connecting part configured to be provided on an outer side of the brush holder part in a diameter direction and to connect an external connector; and a convex part configured to be provided in the power supply member, to go into one of the pair of concave parts, and to determine a position of the connector connecting part with respect to the first case and the second case in the circumferential direction of the rotating body.

2. The motor device according to claim 1, wherein the convex part is provided between the brush holder part and the connector connecting part.

3. The motor device according to claim 2, wherein the power supply member has conductive members configured to be provided between the brush holder part and the connector connecting part and to enable the drive current to flow therethrough, and a cover member configured to cover the conductive members, and wherein the cover member forms the convex part.

4. The motor device according to claim 1, wherein the first case is a gear case configured to house a deceleration mechanism therein, wherein the deceleration mechanism comprises a worm gear provided in the rotating body, a worm wheel gear configured to mesh with the worm gear, and an output shaft configured to output rotation of the worm wheel gear to the outside, wherein the gear case has a support hole configured to support the output shaft such that the output shaft can freely turn, and wherein the pair of concave parts is formed in the gear case to face each other in an extension direction of a line segment parallel to an extension direction of the support hole.

5. The motor device according to claim 4, wherein the second case is a motor yoke having permanent magnets mounted therein, wherein the motor yoke has a pair of plane surface parts and a pair of circular arc surface parts, with each pair facing each other in directions intersecting the shaft direction of the rotating body, and wherein the pair of plane surface parts faces each other in an extension direction of a line segment parallel to the extension direction of the support hole.

6. The motor device according to claim 5, wherein the permanent magnets are each mounted inside the pair of circular arc surface parts.

* * * * *